United States Patent
Lim et al.

(10) Patent No.: US 10,301,503 B2
(45) Date of Patent: May 28, 2019

(54) POLY(ARYLENE ETHER) RESIN COMPOSITION AND CABLE COATED WITH THE SAME

(71) Applicant: LG CHEM, LTD., Seoul (KR)

(72) Inventors: Sung Hwan Lim, Daejeon (KR); Nam Jib Park, Daejeon (KR); Gun Ko, Daejeon (KR); Soo Min Lee, Daejeon (KR); Sang Wook Na, Daejeon (KR); Byung Wook Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 135 days.

(21) Appl. No.: 15/509,810

(22) PCT Filed: Jun. 13, 2016

(86) PCT No.: PCT/KR2016/006227
§ 371 (c)(1),
(2) Date: Mar. 8, 2017

(87) PCT Pub. No.: WO2016/208896
PCT Pub. Date: Dec. 29, 2016

(65) Prior Publication Data
US 2017/0306175 A1  Oct. 26, 2017

(30) Foreign Application Priority Data

Jun. 17, 2015  (KR) .................. 10-2015-0085812
Jun. 10, 2016  (KR) .................. 10-2016-0072077

(51) Int. Cl.
| | | |
|---|---|---|
| C08L 25/06 | (2006.01) | |
| C09D 171/12 | (2006.01) | |
| C08K 5/00 | (2006.01) | |
| C08L 71/12 | (2006.01) | |
| C09D 5/18 | (2006.01) | |
| H01B 3/42 | (2006.01) | |
| H01B 7/295 | (2006.01) | |
| C08L 53/02 | (2006.01) | |

(52) U.S. Cl.
CPC .............. *C09D 171/12* (2013.01); *C08K 5/00* (2013.01); *C08K 5/0066* (2013.01); *C08L 25/06* (2013.01); *C08L 71/12* (2013.01); *C08L 71/123* (2013.01); *C09D 5/18* (2013.01); *H01B 3/427* (2013.01); *H01B 7/295* (2013.01); *C08L 53/02* (2013.01); *C08L 2201/02* (2013.01); *C08L 2203/202* (2013.01); *C08L 2205/02* (2013.01); *C08L 2205/03* (2013.01)

(58) Field of Classification Search
CPC ..... C08L 71/12; C08L 53/02; C08L 2205/025
See application file for complete search history.

(56) References Cited

U.S. PATENT DOCUMENTS

| | | | |
|---|---|---|---|
| 5,932,648 A | 8/1999 | Troska et al. | |
| 6,120,709 A * | 9/2000 | Ishikawa | H01B 1/24 252/510 |
| 2004/0102551 A1 | 5/2004 | Sato et al. | |
| 2006/0106139 A1* | 5/2006 | Kosaka | C08K 5/0066 524/90 |
| 2006/0278425 A1* | 12/2006 | Harada | C08L 23/04 174/110 R |
| 2008/0045655 A1* | 2/2008 | Balfour | C08L 71/123 525/98 |
| 2009/0088502 A1 | 4/2009 | Qiu et al. | |
| 2012/0308753 A1* | 12/2012 | Balfour | C08J 3/203 428/36.92 |
| 2014/0088229 A1* | 3/2014 | Balfour | C08L 71/123 524/127 |
| 2014/0213728 A1* | 7/2014 | Kosaka | C08F 297/08 525/97 |
| 2015/0252214 A1 | 9/2015 | Shan | |

FOREIGN PATENT DOCUMENTS

| | | |
|---|---|---|
| CN | 1711317 A | 12/2005 |
| CN | 101595183 A | 12/2009 |
| EP | 0468593 A2 | 1/1992 |
| EP | 0639620 | 2/1995 |
| EP | 0850284 B1 | 5/1999 |
| EP | 2048198 A1 | 4/2009 |
| JP | 58-083054 A | 5/1983 |

(Continued)

OTHER PUBLICATIONS

Odian Principles of Polymerization, 4th edition, (Year: 2004).*

*Primary Examiner* — Mark S Kaucher
(74) *Attorney, Agent, or Firm* — Dentons US LLP (57) ABSTRACT

The present invention relates to a poly(arylene ether) resin composition and a cable coated with the same. More particularly, the present invention relates to a poly(arylene ether) resin composition, including 20 to 40% by weight of a poly(arylene ether) resin, 15 to 35% by weight of a low-molecular weight styrene-based block copolymer having a weight-average molecular weight of 90,000 g/mol or less, 10 to 30% by weight of a high-molecular weight styrene-based block copolymer having a weight-average molecular weight of 95,000 g/mol or more, 1 to 20% by weight of a flame retardant, and 0 to 20% by weight of an additive.

In accordance with the present invention, a poly(arylene ether) resin composition having superior flame retardancy, tensile strength, flexibility, extrusion processability, elongation, and appearance characteristics and a cable coated with the same are provided.

13 Claims, 4 Drawing Sheets

(56) References Cited

FOREIGN PATENT DOCUMENTS

| | | |
|---|---|---|
| JP | 2014-515433 A | 6/2014 |
| JP | 2014-195609 A | 10/2014 |
| JP | 2015-044934 A | 3/2015 |
| KR | 1020130077468 A | 7/2013 |
| KR | 1020140131652 A | 11/2014 |
| WO | 2008/106363 A2 | 9/2008 |
| WO | 2014-075291 A1 | 5/2014 |
| WO | 2014075291 A1 | 5/2014 |

* cited by examiner

POLY(ARYLENE ETHER) RESIN COMPOSITION AND CABLE COATED WITH THE SAME

TECHNICAL FIELD

Cross-Reference to Related Application(s)

This application is a National Stage Application of International Application No. PCT/KR2016/006227, filed Jun. 13, 2016, and claims the benefit of Korean Patent Application No. 10-2016-0072077, filed Jun. 10, 2016, and Korean Patent Application No. 10-2015-0085812, filed Jun. 17, 2015 the contents of which are incorporated herein by reference in their entirety for all purposes as if fully set forth below.

The present invention relates to a poly(arylene ether) resin composition, and more particularly to a poly(arylene ether) resin composition having superior flame retardancy, tensile strength, flexibility, extrusion processability, elongation, and appearance characteristics and a cable coated with the same.

Background Art

Conventionally, halogenated resins, i.e., poly(vinyl chloride) resin, were generally used as materials of insulated electric wires and wires for optical conductors. Poly(vinyl chloride) resins have advantages such as relatively low cost, broad application range, flexibility, and intrinsic flame retardancy, and disadvantages such as generation of dioxin and large amounts of toxic gases when combusted. Accordingly, a variety of materials to replace poly(vinyl chloride) resins are being researched in fields related with electrical wires including cables, but flame retardancy, processability and productivity thereof have failed to meet expectations.

Since modified poly(arylene ether) resins that are recently attracting attention have superior flame retardancy and insulation, the modified poly(arylene ether) resins are often applied as a substitute of a material for wires in various fields. However, since styrene-based block copolymers that are added to address low flexibility of poly(arylene ether) resins are relatively expensive, there is a burden due to cost increase of raw materials.

In addition, while an extrusion speed of a wire manufactured using equipment for mass production of conventional poly(vinyl chloride) resins is 900 to 1,200 m per minute, the extrusion speed is merely approximately 300 m per minute in the case of a conventional modified poly(arylene ether) resin, whereby productivity is dramatically decreased, compared to a poly(vinyl chloride) resin.

For these reasons, related industries are currently trying to reduce price burden of a styrene-based block copolymer while improving the extrusion of wires by applying a polyolefin-based material.

For example, KR 10-2013-0077468 A, which relates to a phosphorus flame retardant including a base resin, which includes a poly(arylene ether) resin and a polyolefin resin, and a thermoplastic resin composition, attempted to address the above problems by applying a polyolefin-based resin. However, such a conventional technology using a three-component resin composition of a poly(arylene ether) resin, a polyolefin-based resin, and a styrene-based block copolymer has still not addressed the fundamental problems of poly(arylene ether) resins, such as extrusion processability and hardness.

RELATED ART DOCUMENT

[Patent Document]
(Patent Document 1) KR 2013-0077468 A

DISCLOSURE

Technical Problem

Therefore, the present invention has been made in view of the above problems, and it is one object of the present invention to provide a poly(arylene ether) resin composition having superior flame retardancy, tensile strength, flexibility, extrusion processability, elongation, and appearance characteristics.

It is another object of the present invention to provide a cable coated with the poly(arylene ether) resin composition.

The above and other objects can be accomplished by the present invention described below.

Technical Solution

In accordance with an aspect of the present invention, the above and other objects can be accomplished by the provision of a poly(arylene ether) resin composition, including 20 to 40% by weight of a poly(arylene ether) resin, 15 to 35% by weight of a low-molecular weight styrene-based block copolymer having a weight-average molecular weight of 90,000 g/mol or less, 10 to 30% by weight of a high-molecular weight styrene-based block copolymer having a weight-average molecular weight of 95,000 g/mol or more, 1 to 20% by weight of a flame retardant, and 0 to 20% by weight of an additive.

The poly(arylene ether) resin may be, for example, a poly(phenylene ether) resin.

The low-molecular weight styrene-based block copolymer may have, for example, a weight-average molecular weight of 80,000 g/mol or less.

The low-molecular weight styrene-based block copolymer may have, for example, a melt index (230° C./2.16 kg) of 3 g/10 min or less.

A styrene content in the low-molecular weight styrene-based block copolymer may be, for example, 20 to 40% by weight.

The high-molecular weight styrene-based block copolymer may have, for example, a weight-average molecular weight of 100,000 g/mol or more.

The high-molecular weight styrene-based block copolymer may have, for example, a melt index (230° C./5 kg) of 15 g/10 min or more.

A styrene content in the high-molecular weight styrene-based block copolymer may be, for example, 10 to 25% by weight.

The styrene-based block copolymer may be, for example, a styrene-ethylene-butylene-styrene copolymer.

The additive may be, for example, one or more selected from the group consisting of mineral oil, a thermal stabilizer, a lubricant, an antioxidant, a light stabilizer, a chain extender, a reaction catalyst, a release agent, a pigment, a dye, an antistatic agent, an antimicrobial agent, a processing aid, a metal deactivator, a flame retardant, a fluorine-based anti-dripping agent, an inorganic filler, glass fiber, an anti-wear and anti-abrasion agent, and a coupling agent.

The poly(arylene ether) resin composition may have, for example, a melt index (250° C./10 kg) of 20 g/10 min or more.

The poly(arylene ether) resin composition may have, for example, a tensile strength of 240 kgf/cm² or more.

The poly(arylene ether) resin composition may have, for example, an elongation of 175% or more.

The poly(arylene ether) resin composition may have, for example, a Shore A hardness of 80 to 97.

In accordance with another aspect of the present invention, there is provided a cable coated with the poly(arylene ether) resin composition.

Advantageous Effects

As apparent from the above description, the present invention provides a poly(arylene ether) resin composition having superior flame retardancy, tensile strength, flexibility, extrusion processability, elongation, and appearance characteristics and a cable coated with the same.

BEST MODE

Hereinafter, the present invention is described in detail.

The present inventors confirmed that a two-component resin composition of a poly(arylene ether) resin and a styrene-based block copolymer, which is prepared by mixing a poly(arylene ether) resin with low-molecular weight and high-molecular weight styrene-based block copolymers, exhibits superior extrusion processability, flame retardancy, and the like, compared to a conventional modified poly(arylene ether) resin composition, thus completing the present invention.

The poly(arylene ether) resin composition of the present invention includes 20 to 40% by weight of a poly(arylene ether) resin, 15 to 35% by weight of a low-molecular weight styrene-based block copolymer having a weight-average molecular weight of 90,000 g/mol or less, 10 to 30% by weight of a high-molecular weight styrene-based block copolymer having a weight-average molecular weight of 95,000 g/mol or more, 1 to 20% by weight of a flame retardant, and 0 to 20% by weight of an additive.

Hereinafter, each constituent of the poly(arylene ether) resin composition of the present invention is described in detail.

The poly(arylene ether) resin may be, for example, a homopolymer including a unit represented by Formula 1 or 2 below; or a copolymer including a unit represented by Formula 1 or 2 below:

[Formula 1]

[Formula 2]

wherein Ra, R1, $R_2$, $R_3$ and $R_4$, which are substituents of an arylene group (Ar) or phenylene group, are each independently or simultaneously hydrogen, chlorine, bromine, or iodine or a methyl, ethyl, propyl, allyl, phenyl, methylbenzyl, chloromethyl, bromomethyl, cyanoethyl, cyano, methoxy, phenoxy or nitro group, n is an integer of 4 to 20, and Ar is a $C_7$ to $C_{20}$ arylene group. For example, $R_1$ and $R_2$ may be an alkyl group or a $C_1$ to $C_4$ alkyl group, and $R_3$ and $R_4$ may be hydrogen.

The poly(arylene ether) resin may be, for example, a poly(phenylene ether)-based resin.

As a specific example, the poly(phenylene ether)-based resin may be a poly(arylene ether) resin including a unit represented by [Formula 3] below:

[Formula 3]

wherein W, X, Y and Z are each independently or simultaneously hydrogen, chlorine, bromine, or iodine or a methyl, ethyl, propyl, allyl, phenyl, methylbenzyl, chloromethyl, bromomethyl, cyanoethyl, cyano, methoxy, phenoxy, or nitro group, and n, which indicates the number of repeat units, is an integer of 3 to 1000, an integer of 3 to 100, or an integer of 5 to 60.

The homopolymer of the poly(arylene ether) resin may be one or more selected from the group consisting of, for example, poly(2,6-dimethyl-1,4-phenylene) ether, poly(2,6-diethyl-1,4-phenylene) ether, poly(2-methyl-6-propyl-1,4-phenylene) ether, poly(2,6-dipropyl-1,4-phenylene) ether, poly(2-ethyl-6propyl-1,4-phenylene) ether, poly(2,6-dimethoxy-1,4-phenylene) ether, poly(2,6-dichloromethyl-1,4-phenylene) ether, poly(2,6-dibromomethyl-1,4-phenylene) ether, poly(2,6-diphenyl-1,4-phenylene) ether and poly(2,5-dimethyl-1,4-phenylene) ether, but the present invention is specifically not limited thereto.

In addition, the copolymer of the poly(arylene ether) resin may be, as a specific example, a poly(phenylene ether)-based copolymer, a main chain of which is poly(phenylene ether), such as a copolymer of 2,6-dimethylphenol and 2,3,6-trimethylphenol, a copolymer of 2,6-dimethylphenol and o-cresol, or a copolymer of 2,3,6-trimethylphenol and o-cresol, but the present invention is specifically not limited thereto.

The poly(arylene ether) resin may be, other than the homopolymers and copolymers of the poly(arylene ether) resin, for example, a modified poly(arylene ether) resin obtained by reacting α,β-unsaturated carboxylic acid or a derivative thereof, sterin or a derivative thereof, or unsaturated carboxylic acid or a derivative thereof with the homopolymer or copolymer of the poly(arylene ether) in a molten state, a solution state, or a slurry state at 30 to 350° C. in the presence or absence of an initiator.

The poly(arylene ether) resin may have an intrinsic viscosity (measured under conditions of 0.5 g/dl, chloroform solution, and 30° C.) of, for example, 0.25 to 0.50 dl/g, 0.30 to 0.50 dl/g, or 0.35 to 0.45 dl/g. Within this range, superior extrusion processability is provided.

The amount of the poly(arylene ether) resin may be, for example, 20 to 40% by weight based on a total weight of the resin composition according to the present invention. When the amount is less than 20% by weight, it is difficult to realize flame retardancy, tensile strength is decreased, and raw material costs increase. When the amount is greater than 40% by weight, there are advantages in terms of flame retardancy. However, hardness remarkably increases, elongation and flexibility required in electric wires are not satisfied, and productivity may be decreased due to a relatively low melt index.

In another embodiment, the amount of the poly(arylene ether) resin may be 25 to 35% by weight or 28 to 33% by weight. Within this range, suitable flame retardancy is realized and, upon extrusion to an electric wire, flexibility and elongation with respect to the standard are satisfied.

The styrene-based block copolymer may be, for example, a low- or high-molecular weight styrene-based block copolymer. The low-molecular weight styrene-based block copolymer refers to, for example, a styrene-based block copolymer having a weight-average molecular weight of 90,000 g/mol or less, and the high-molecular weight styrene-based block copolymer refers to, for example, a styrene-based block copolymer having a weight-average molecular weight of 95,000 g/mol or more.

The low-molecular weight styrene-based block copolymer may have a weight-average molecular weight, for example, 80,000 g/mol or less, 10,000 to 80,000 g/mol, or 30,000 to 80,000 g/mol. Within this range, superior flexibility and extrusion processability are provided.

The high-molecular weight styrene-based block copolymer may have a weight-average molecular weight of, for example, 98,000 g/mol or more, 98,000 to 240,000 g/mol, or 100,000 to 200,000 g/mol. Within this range, superior elongation and appearance characteristics are provided.

the low- or high-molecular weight styrene-based block copolymer may be, for example, one or a mixture of two or more selected from the group consisting of a styrene-butadiene copolymer, a styrene-ethylene-propylene copolymer, a styrene-isoprene copolymer, an α-methylstyrene-butadiene copolymer, a styrene-butadiene-styrene copolymer, a styrene-ethylene-propylene-styrene copolymer, a styrene-ethylene-butylene-styrene copolymer, a styrene-(ethylene-butylene/styrene copolymer)-styrene copolymer, a styrene-isoprene-styrene copolymer, an α-methylstyrene-butadiene-α-methylstyrene copolymer, and a modified product obtained by selectively hydrogenating the same.

As a specific example, the low- or high-molecular weight styrene-based block copolymer may be a styrene-ethylene-butylene-styrene copolymer. The styrene-ethylene-butylene-styrene copolymer may be, for example, a linear polymeric compound.

The low-molecular weight styrene-based block copolymer may have, for example, a melt index (230° C./2.16 kg) of 3 g/10 min or less. When the melt index is greater than 3 g/10 min, extrusion processability is decreased. In another embodiment, the low-molecular weight styrene-based block copolymer may have a melt index (230° C./2.16 kg) of 1 to 3 g/10 min, or 1.5 to 2.5 g/10 min. Within this range, superior elongation is provided.

The high-molecular weight styrene-based block copolymer may have, for example, a melt index (230° C./5 kg) of 15 g/10 min or more. When the melt index is less than 15 g/10 min, hardness is decreased. In another embodiment, the high-molecular weight styrene-based block copolymer may have a melt index (230° C./5 kg) of 18 g/10 min or more, 20 g/10 min or more, or 20 to 30 g/10 min. Within this range, superior flexibility and flame retardancy are provided.

A styrene content in the low- or high-molecular weight styrene-based block copolymer may be, for example, 10 to 40% by weight. As a specific example, the styrene content in the low-molecular weight styrene-based block copolymer may be 20 to 40% by weight, or 25 to 35% by weight, and the styrene content in the high-molecular weight styrene-based block copolymer may be 10 to 25% by weight, or 10 to 15% by weight. Within this range, superior flame retardancy is provided.

The styrene-based block copolymer may be prepared, for example, by mixing the high-molecular weight styrene-based block copolymer with the a low-molecular weight styrene-based block copolymer in a weight ratio of 1:1.1 to 1:3, or 1:1.3 to 1:2.5, or 1:1.5 to 1:2. Within this range, superior extrusion processability is provided.

The low-molecular weight styrene-based block copolymer may have, for example, a Shore A hardness of 50 to 90, 60 to 90, or 70 to 90. Within this range, superior property balance is provided.

In addition, the high-molecular weight styrene-based block copolymer may have, for example, a Shore A hardness of 30 to 80, 30 to 70, or 40 to 60. Within this range, superior property balance is provided.

The hardness may increase proportionally to increase in the content of a vinyl aromatic monomer such as the styrene.

The amount of the low-molecular weight styrene-based block copolymer may be, for example, 15 to 35% by weight based on a total weight of the resin composition according to the present invention. When the amount is less than 15% by weight, flexibility may be decreased, and, when the amount is greater than 35% by weight, a melt index may be decreased and thus productivity may be decreased. In another embodiment, the amount of the low-molecular weight styrene-based block copolymer may be 20 to 35% by weight, or 20 to 30% by weight based on a total weight of the resin composition according to the present invention. Within this range, superior flame retardancy is provided.

The amount of the high-molecular weight styrene-based block copolymer may be, for example, 10 to 30% by weight based on a total weight of the resin composition according to the present invention. When the amount is less than 10% by weight, hardness increases and, when the amount is greater than 30% by weight, flame retardancy is considerably poor and cost efficiency is low. In another embodiment, the amount of the high-molecular weight styrene-based block copolymer may be 10 to 25% by weight, or 10 to 20% by weight based on a total weight of the resin composition according to the present invention. Within this range, superior extrusion processability is provided.

The flame retardant may be one or more selected from the group consisting of, for example, a nitrogenous flame retardant, a solid phosphorus flame retardant, and a liquid phosphorus flame retardant (room temperature, 20 to 26° C.). Preferably, the flame retardant may be two or more selected from the group consisting of an organic metal phosphinate-based flame retardant, a nitrogenous/phosphorus flame retardant in solid state at room temperature, and an organic phosphate-based flame retardant in liquid state at room temperature. In this case, superior flame retardancy and processability are provided.

The solid or liquid state of the flame retardant refers to state at room temperature, 22 to 23° C., or 20 to 26° C. under atmospheric pressure.

The solid or liquid phosphorus flame retardant may be, for example, a general flame retardant used to provide flame retardancy to a synthetic resin or resin composition. In another embodiment, to provide eco-friendly flame retardancy, a halogen-based flame retardant might not be used. In addition, the remaining phosphorus flame retardants, except for a red phosphorus flame retardant, among phosphorus flame retardants may be used. As a specific example, the solid or liquid phosphorus flame retardant may be one or more selected from the group consisting of a phosphate ester compound, phosphate, pyrophosphate, phosphonate, metal-substituted phosphinate, phosphanate, and metal phosphate. The phosphate ester compound may be, for example, a phosphate compound having an alkyl group or an aromatic group. As a specific example, the phosphate ester compound may be one or more selected from the group consisting of trimethylphosphate, triethylphosphate, tributylphosphate, trioctylphosphate, triphenylphosphate, tricresylphosphate, triylylyphosphate, cresyldiphenylphosphate, octyldiphenylphosphate and an aromatic diphosphate represented by [Formula 4] below:

[Formula 4]

wherein $Ar_1$, $Ar_2$, $Ar_3$ and $Ar_4$ are each independently or simultaneously a phenyl group or an aryl group substituted with one to three $C_1$ to $C_4$ alkyl groups, R is phenylene or and n is an integer of 1 to 5.

The metal phosphate may be, for example, aluminum dialkyl phosphate.

The nitrogenous flame retardant may be, for example, a general flame retardant used to provide flame retardancy to the synthetic resin or resin composition. In another embodiment, the nitrogenous flame retardant may be melamine or a derivative thereof. As a specific example, the nitrogenous flame retardant may be one or more selected from the group consisting melamine, cyanuric melamine, and a melemphosphoric acid reaction product and mixtures thereof, e.g., melamine phosphate, melamine pyrophosphate, and melamine polyphosphate.

The amount of the flame retardant may be, for example, 1 to 20% by weight based on a total weight of the resin composition according to the present invention. When the amount is greater than 20% by weight, dispersion of a flame retardant might not be satisfactorily performed, and appearance and quality may be deteriorated due to the flame retardant protruding from a surface of a processed and molded electric wire. Accordingly, mechanical properties of an electric wire are remarkable deteriorated. In another embodiment, the amount of the flame retardant may be 5 to 20% by weight or 10 to 20% by weight based on a total weight of the resin composition according to the present invention. Within this range, superior flame retardancy is provided.

In addition, the poly(arylene ether) resin composition according to the present invention may include, for example, one or more additives selected from the group consisting of mineral oil, a thermal stabilizer, a lubricant, an antioxidant, a light stabilizer, a chain extender, a reaction catalyst, a release agent, a pigment, a dye, an antistatic agent, an antimicrobial agent, a processing aid, a metal deactivator, a flame retardant, a fluorine-based anti-dripping agent, an inorganic filler, glass fiber, an anti-wear and anti-abrasion agent, and a coupling agent.

The lubricant may be included in an amount of, for example, 5% by weight or less, 0.1 to 5% by weight, or 1 to 5% by weight.

The antioxidant may be included in an amount of, for example, 1% by weight or less, 0.01 to 1% by weight, or 0.1 to 1% by weight.

The mineral oil may be included in an amount of, for example, 1% by weight or less, 0.01 to 1% by weight, or 0.1 to 1% by weight.

The release agent (lubricant) may be included in an amount of, for example, 1% by weight or less, 0.01 to 1% by weight, or 0.1 to 1% by weight.

In addition, a kneading device used in the present invention may be, for example, a banbury mixer, a single screw extruder, a twin screw extruder, a buss kneader, or the like.

The poly(arylene ether) resin composition according to the present invention may have, for example, a melt index (250° C./10 kg) of 20 g/10 min to 100 g/10 min, or 20 g/10 min to 50 g/10 min, or 25 g/10 min to 35 g/10 min. Within this range, superior extrusion processability is provided.

The poly(arylene ether) resin composition may have, for example, a tensile strength of 220 to 400 kgf/cm$^2$, 220 to 350 kgf/cm$^2$, 240 to 350 kgf/cm$^2$, or 245 to 320 kgf/cm$^2$.

The poly(arylene ether) resin composition may have, for example, an elongation of 175% to 350%, 190% to 300%, or 200% to 250%.

The poly(arylene ether) resin composition may have, for example, a Shore A hardness of 80 to 97, 85 to 93, or 88 to 90.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLES (A) Poly(arylene ether), (B) the low-molecular weight styrene-based block copolymer, (C-1 to C-4) a high-molecular weight styrene-based block copolymer, (D) a flame retardant, and (E) the additives used in the following examples and comparative examples are as follows:

(A) Poly(Arylene Ether) (PPE)

A poly(phenylene ether) resin (product name: PX 100F, manufactured by Mitsubishi Engineering Plastics) having a viscosity of 0.38±0.02 dl/g, a volatile content of 0.6% by weight or less, a whiteness of 95% or more, and a bulk density of 0.6±0.2 g/ml was used.

(A) Low-Molecular Weight Styrene-Based Block Copolymer (SBC)

A styrene-based block copolymer (product name: LCY 9552, manufactured by LCY Chemical) having a styrene content of 30%, a weight-average molecular weight of 75,000 g/mol, a melt index (230° C./2.16 kg) of 1.5 to 2.5 g/10 min, and a hardness of 80 was used.

(C-1) High-Molecular Weight Styrene-Based Block Copolymer (SBC)

A styrene-based block copolymer (product name: LCY 9557, manufactured by LCY Chemical) having a styrene content of 13%, a weight-average molecular weight of 100,000 g/mol, a melt index (230° C./5 kg) of 21 g/10 min, and a hardness of 53 was used.

(C-2) High-Molecular Weight Styrene-Based Block Copolymer (SBC)

A styrene-based block copolymer (product name: SBC G 1657, manufactured by Kraton) having a styrene content of 13%, a weight-average molecular weight of 105,000 g/mol, a melt index (230° C./5 kg) of 22 g/10 min, and a hardness of 47 was used.

(C-3) High-Molecular Weight Styrene-Based Block Copolymer (SBC)

A styrene-based block copolymer (product name: SBC G 1651, manufactured by Kraton) having a styrene content of 31.5%, a weight-average molecular weight of 241,000 g/mol, and a hardness of 60 was used (with regard to melt index (230° C./5 kg), flow was not observed).

(C-4) High-Molecular Weight Styrene-Based Block Copolymer (SBC)

A styrene-based block copolymer (manufactured by Kraton, product name: SBC G 1650) having a styrene content of 30%, a weight-average molecular weight of 95,000 g/mol, a melt index (230° C./5 kg) of less than 1 g/10 min, and a hardness of 72 was used.

(A) Flame Retardant (FR)

Aluminum diethylphosphate (product name: OP 1230, manufactured by Clariant), in which a phosphorus content was 23 to 24%; bisphenol-A-diphenylphosphate (product name: FP-600, manufactured by Adeka), as a phosphorus flame retardant in liquid state at room temperature; and melaminepolyphosphate (product name: NONFLA 601, manufactured by DOOBON), in which a nitrogen content was 39 to 42% and a phosphorus content was 14 to 17%, as a nitrogenous flame retardant, were mixed and used.

(A) Additives (Others)

As additives, a mixture of silicon-based and amide-based lubricants, a mixture of phenolic and phosphite antioxidants, mineral oil, and a lubricant were used.

Example 1

(A) 32% by weight of poly(arylene ether), (B) 28% by weight of the low-molecular weight styrene-based block copolymer, (C-1) 18% by weight of the high-molecular weight styrene-based block copolymer, (D) 16% by weight of the flame retardant, and (E) 6% by weight of the additives were mixed by means of a super mixer and melted and kneaded at 200 to 290° C. by means of a twin screw extruder, followed by being prepared into a pellet-type resin composition through extrusion processing.

Example 2

A pellet-type resin composition was prepared in the same manner as in Example 1, except that (A) 34% by weight of poly(arylene ether), (B) 26% by weight of the low-molecular weight styrene-based block copolymer, (C-2) 16% by weight of the high-molecular weight styrene-based block copolymer, (D) 17% by weight of the flame retardant, and (E) 7% by weight of the additives were mixed.

Example 3

A pellet-type resin composition was prepared in the same manner as in Example 1, except that (A) 28% by weight of poly(arylene ether), (B) 26% by weight of the low-molecular weight styrene-based block copolymer, (C-1) 21% by weight of the high-molecular weight styrene-based block copolymer, (D) 19% by weight of the flame retardant and (E) 6% by weight of the additives were mixed, as summarized in Table 1 below.

Comparative Example 1

A pellet-type resin composition was prepared in the same manner as in Example 2, except that (C-3) the high-molecular weight styrene-based block copolymer was added in the same amount as (B) the low-molecular weight styrene-based block copolymer, instead of (B) the low-molecular weight styrene-based block copolymer.

Comparative Example 2

A pellet-type resin composition was prepared in the same manner as in Example 2, except that (C-4) the high-molecular weight styrene-based block copolymer was added in the same amount as (B) the low-molecular weight styrene-based block copolymer, instead of (B) the low-molecular weight styrene-based block copolymer.

Comparative Example 3

A pellet-type resin composition was prepared in the same manner as in Example 2, except that (C-3) the high-molecular weight styrene-based block copolymer was added in the same amount as (B) the low-molecular weight styrene-based block copolymer, instead of (B) the low-molecular weight styrene-based block copolymer, and (C-1) the high-molecular weight styrene-based block copolymer was added in the same amount as (C-2) the high-molecular weight styrene-based block copolymer, instead of (C-2) the high-molecular weight styrene-based block copolymer.

Comparative Example 4

A pellet-type resin composition was prepared in the same manner as in Example 2, except that (C-4) the high-molecular weight styrene-based block copolymer was added in the same amount as (B) the low-molecular weight styrene-based block copolymer, instead of (B) the low-molecular weight styrene-based block copolymer, and (C-1) the high-molecular weight styrene-based block copolymer was added in the same amount as (C-2) the high-molecular weight styrene-based block copolymer, instead of (C-2) the high-molecular weight styrene-based block copolymer.

Comparative Example 5

A pellet-type resin composition was prepared in the same manner as in Example 1, except that, (A) 19% by weight of poly(arylene ether), (B) 33% by weight of the low-molecular weight styrene-based block copolymer, (C-1) 16% by weight of the high-molecular weight styrene-based block copolymer, (D) 25% by weight of the flame retardant, and (E) 7% by weight of the additives were mixed, as summarized in Table 1 below.

Comparative Example 6

A pellet-type resin composition was prepared in the same manner as in Example 1, except that, (A) 41% by weight of poly(arylene ether), (B) 8% by weight of the low-molecular weight styrene-based block copolymer, (C-1) 23% by weight of the high-molecular weight styrene-based block copolymer, (D) 21% by weight of the flame retardant, and (E) 7% by weight of the additives were mixed, as summarized in Table 1 below.

Manufacturing Example

The pellet-type resin composition prepared according to each of Examples 1 to 3 and Comparative Examples 1 to 6 was dried at 80° C. for four hours and stood for one day at room temperature. Subsequently, a resultant product was extruded under extrusion conditions of 220 to 270° C., 80 rpm, and a speed of 35 m/min by means of a wire coating extruder (19 Ø HAAKE extruder manufactured by Thermo Scientific, Germany), thereby manufacturing a cable specimen.

Test Example

Properties of the cable specimen of the poly(arylene ether) resin composition obtained according to each of Examples 1 to 3 and Comparative Examples 1 to 6 were measured according to the following methods. Results are summarized in Table 1 below.
Measurement Methods
Weight-average molecular weight: Calibrated using PC standard by means of Agilent 1200 series GPC. A measurement method was as follows.
<Analytical Instrument>
Column: Polymer Lab mixed B×2
Solvent: Tetrahydrofuran (0.45 μm filtered)
Flow: 1.0 ml/min
Injection volume: 100 μL (0.45 μm filtered)
Running time: 25 min
Detector: Agilent RI detector
<Experimental Process>
1) An appropriate amount of sample was taken, dissolved in THF at a concentration of 1 mg/ml, and filtered through a 0.45 μm syringe filter.
2) GPC chromatogram was obtained by injecting a sample solution.
3) GPC chromatogram was obtained by injecting a standard solution.
4) A calibration curve and an equation were obtained from the GPC chromatogram of the standard solution. A retention time of the sample solution was substituted into the equation to obtain the weight-average molecular weight of the sample.
Cable appearance evaluation: Inspected and evaluated with the naked eye upon extrusion of a cable according to UL 1581.
Tensile strength: Measured according to UL 1581 using a cable specimen.
Elongation (tensile elongation): Measured according to UL 1581 using a cable specimen.
Flame retardancy (VW-1): Measured according to UL 1581 using a cable specimen.
Melt index: Measured according to a standard measurement method, ASTM D1238 (230° C./2.16 kg, 230° C./5 kg and 250° C./10 kg).
Hardness (Shore A): Measured according to a standard measurement method, ASTM D2240.

TABLE 1

| Classification | Examples | | | Comparative Examples | | | | | |
|---|---|---|---|---|---|---|---|---|---|
| | 1 | 2 | 3 | 1 | 2 | 3 | 4 | 5 | 6 |
| (A) PPE (% by weight) | 32 | 34 | 28 | 34 | 34 | 34 | 34 | 19 | 41 |
| (B) SBC (% by weight) | 28 | 26 | 26 | — | — | — | — | 33 | 8 |
| (C-1) SBC (% by weight) | 18 | — | 21 | — | — | 16 | 16 | 16 | 23 |
| (C-2) SBC (% by weight) | — | 16 | | 16 | 16 | — | — | | |
| (C-3) SBC (% by weight) | — | — | | 26 | — | 26 | — | | |
| (C-4) SBC (% by weight) | — | — | | — | 26 | — | 26 | | |
| (D) FR (% by weight) | 16 | 17 | 19 | 17 | 17 | 17 | 17 | 25 | 21 |
| (E) Others | 6 | 7 | 6 | 7 | 7 | 7 | 7 | 7 | 7 |
| Mechanical characteristics of cable specimens | | | | | | | | | |
| melt index (MI 250° C./10 kg, g/10 min) | 31 | 29 | 37 | 2 | 13 | 1.5 | 11 | 3 | 47 |
| Tensile strength (room temperature TS, kgf/cm$^2$) | 300 | 249 | 221 | 239 | 229 | 211 | 192 | 144 | 410 |
| Elongation (room temperature TE, %) | 235 | 217 | 288 | 138 | 172 | 131 | 128 | 262 | 89 |
| Hardness (Shore A) | 90 | 89 | 88 | 92 | 93 | 92 | 92 | 85 | 97 |
| Flame retardancy (VW-1) | PASS | PASS | PASS | PASS | PASS | PASS | PASS | FAIL | PASS |
| Cable extrudability | | | | | | | | | |
| Torque upon extrusion (Nm) | 31.9 | 29.7 | 42.3 | 61 | 33 | 71 | 37 | 62 | 24.4 |

TABLE 1-continued

|  | Examples | | | Comparative Examples | | | | | |
| --- | --- | --- | --- | --- | --- | --- | --- | --- | --- |
| Classification | 1 | 2 | 3 | 1 | 2 | 3 | 4 | 5 | 6 |
| Pressure upon extrusion (bar) | 71.7 | 68.4 | 87.4 | 100 | 88 | 124 | 104 | 81 | 62 |
| Extrusion processability | ⊚ | ⊚ | ○ | X | X | X | X | X | X |

\* Extrusion processability: Classified into four steps based on appearance quality and productivity upon extrusion of a cable (⊚—very good, ○—good, Δ—normal, X—poor).

Figure 1:
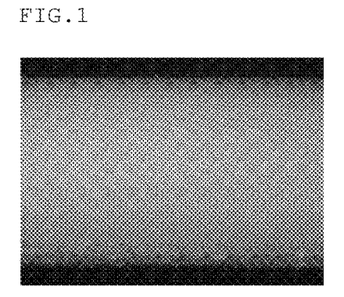
FIGS. 1 to 6 illustrate a cable surface viewed at 150× magnification, manufactured according to each of Examples 1 and 2 and Comparative Examples 1 to 4.
Figure 2:
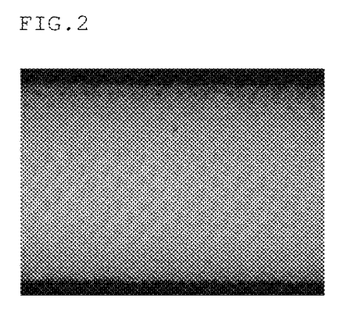
Figure 7:
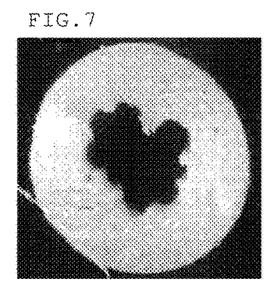
FIGS. 7 to 12 illustrate a photograph of a sectional view of a cable viewed at 150× magnification, manufactured according to each of Examples 1 and 2 and Comparative Examples 1 to 4.
Figure 8:
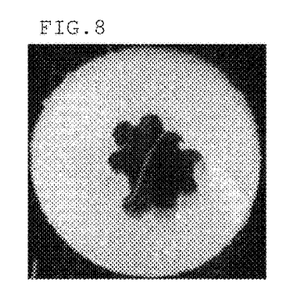

As summarized in [Table 1], it can be confirmed that Examples 1 to 3 including both the low-molecular weight styrene-based block copolymer and the high-molecular weight styrene-based block copolymer of the present invention exhibit a superior melt index (250° C./10 kg) of 20 g/10 min or more, high flexibility, i.e., a tensile strength of 220 kgf/cm$^2$ or more and an elongation of 175% or more, and a superior Shore A hardness range of 80 to 97 and passed the flame retardancy test. Accordingly, it can be confirmed that the poly(arylene ether) resin compositions of Examples 1 to 3 have overall superior mechanical properties and superior balance between respective properties. In addition, it can be confirmed that, in regard to the extrudability of the poly(arylene ether) resin compositions of the present invention, a torque required upon extrusion of a cable is very low, i.e., 32 Nm or less, and a pressure is very low, i.e., 80 bar or less, which indicates superior productivity. Further, as illustrated in the cable surface images of FIGS. 1 and 2 below and the photographs of the cable sectional views of FIGS. 7 and 8, appearance quality of the cables is excellent, which indicates overall superior extrusion processability.

Figure 3:
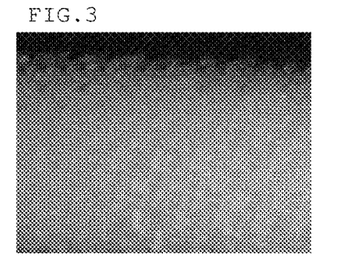
Figure 9:
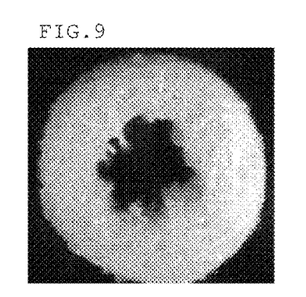
Figure 10:
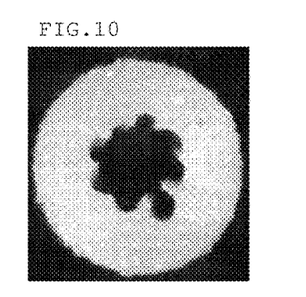

Hereinafter, Comparative Examples 1 to 4 including only the high-molecular weight styrene-based block copolymer are examined. In the case of Comparative Example 1, it can be confirmed that a melt index (250° C./10 kg) is very low, i.e., as 2 g/10 min; flexibility is low, i.e., a tensile strength and an elongation are 239 kgf/cm$^2$ and 138%, respectively; and productivity is very low, i.e., torque and pressure, upon extrusion, are 61 Nm and 100 bar, respectively. In addition, it can be confirmed that, as illustrated in FIGS. 3 and 9, appearance quality is very poor.

Figure 4:
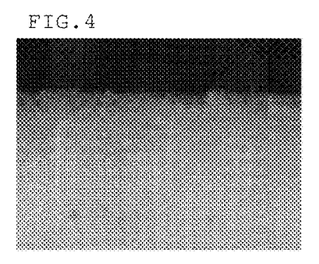

In the case of Comparative Example 2, it can be confirmed that a melt index (250° C./10 kg) is low as 13 g/10 min; flexibility is low, i.e., a tensile strength and an elongation are 229 kgf/cm$^2$ and 172%, respectively; and productivity is low, i.e., torque and pressure, upon extrusion, are 33 Nm and 88 bar, respectively. In addition, it can be confirmed that, as illustrated in FIG. 4, cable surface appearance quality is poor.

Figure 5:
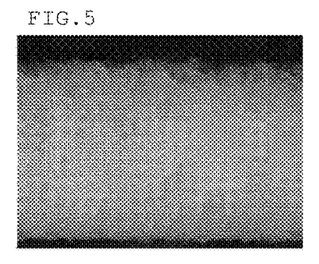
Figure 11:
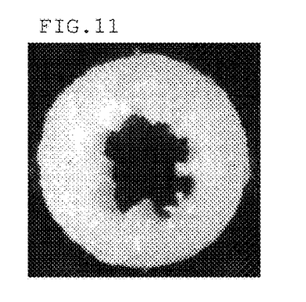

In the case of Comparative Example 3, it can be confirmed that a melt index (250° C./10 kg) is very low, i.e., 1.5 g/10 min; flexibility is very low, i.e., a tensile strength and an elongation are 211 kgf/cm$^2$ and 131%, respectively; and productivity is very low, i.e., torque and pressure, upon extrusion, are 71 Nm and 124 bar, respectively. In addition, it can be confirmed that, as illustrated in FIGS. 5 and 11, appearance quality is very poor.

Figure 6:
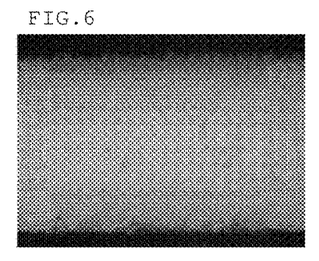
Figure 12:
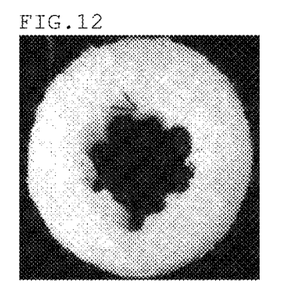

In the case of Comparative Example 4, it can be confirmed that a melt index (250° C./10 kg) is low, i.e., 11 g/10 min; flexibility is very low, i.e., a tensile strength and an elongation are 192 kgf/cm$^2$ and 128%, respectively; and productivity is low, i.e., torque and pressure, upon extrusion, are 37 Nm and 104 bar, respectively. In addition, it can be confirmed that, as illustrated in FIGS. 6 and 12, appearance quality is poor.

In the case of Comparative Example 5 in which the poly(phenylene ether) resin is used in a small amount compared to the present invention, it can be confirmed that melt index, tensile strength, flame retardancy, and extrusion processability are poor. In the case of Comparative Example 5 in which the poly(phenylene ether) resin is used in a large amount compared to the present invention, it can be confirmed that elongation and extrusion processability are remarkably poor.

In conclusion, it can be confirmed that, by mixing the poly(arylene ether) resin, the low- and high-molecular weight styrene-based block copolymers, and the flame retardant, a poly(arylene ether) resin composition exhibiting superior flame retardancy, tensile strength, flexibility, extrusion processability, elongation, and appearance characteristics, and a cable coated with the same are realized.

The invention claimed is:

1. A poly(arylene ether) resin composition, comprising:
   20 to 40% by weight of a poly(arylene ether) resin;
   15 to 35% by weight of a low-molecular weight styrene-based block copolymer having a weight-average molecular weight of 90,000 g/mol or less, wherein a styrene content in the low-molecular weight styrene-based block copolymer is 20 to 40% by weight;
   10 to 30% by weight of a high-molecular weight styrene-based block copolymer having a weight-average molecular weight of 95,000 g/mol or more, wherein a styrene content in the high-molecular weight styrene-based block copolymer is 10 to 25% by weight; and
   1 to 20% by weight of a flame retardant, and 0 to 20% by weight of an additive,
   wherein the poly(arylene ether) resin composition has a melt index (250° C./10 kg) of 20 g/10 min or more.

2. The poly(arylene ether) resin composition according to claim 1, wherein the poly(arylene ether) resin is a poly(phenylene ether) resin.

3. The poly(arylene ether) resin composition according to claim 1, wherein the low-molecular weight styrene-based block copolymer has a weight-average molecular weight of 80,000 g/mol or less.

4. The poly(arylene ether) resin composition according to claim 1, wherein the low-molecular weight styrene-based block copolymer has a melt index (230° C./2.16 kg) of 3 g/10 min or less.

5. The poly(arylene ether) resin composition according to claim 1, wherein the high-molecular weight styrene-based block copolymer has a weight-average molecular weight of 100,000 g/mol or more.

6. The poly(arylene ether) resin composition according to claim 1, wherein the high-molecular weight styrene-based block copolymer has a melt index (230° C./5 kg) of 15 g/10 min or more.

7. The poly(arylene ether) resin composition according to claim 1, wherein the low- or high-molecular weight styrene-based block copolymer is a styrene-ethylene-butylene-styrene copolymer.

8. The poly(arylene ether) resin composition according to claim 1, wherein the additive is one or more selected from the group consisting of mineral oil, a thermal stabilizer, a lubricant, an antioxidant, a light stabilizer, a chain extender, a reaction catalyst, a release agent, a pigment, a dye, an antistatic agent, an antimicrobial agent, a processing aid, a metal deactivator a fluorine-based anti-dripping agent, an inorganic filler, glass fiber, an anti-wear and anti-abrasion agent, and a coupling agent.

9. The poly(arylene ether) resin composition according to claim 1, wherein the poly(arylene ether) resin composition has a tensile strength of 240 kgf/cm$^2$ or more.

10. The poly(arylene ether) resin composition according to claim 1, wherein the poly(arylene ether) resin composition has an elongation of 175% or more.

11. The poly(arylene ether) resin composition according to claim 1, wherein the poly(arylene ether) resin composition has a Shore A hardness of 80 to 97.

12. A cable coated with the poly(arylene ether) resin composition according to claim 1.

13. A poly(arylene ether) resin composition, comprising 20 to 40% by weight of a poly(arylene ether) resin, 15 to 35% by weight of a low-molecular weight styrene-based block copolymer having a weight-average molecular weight of 90,000 g/mol or less, 10 to 30% by weight of a high-molecular weight styrene-based block copolymer having a weight-average molecular weight of 95,000 g/mol or more, 1 to 20% by weight of a flame retardant, and 0 to 20% by weight of an additive, wherein the high-molecular weight styrene-based block copolymer has a melt index (230° C./5 kg) of 15 g/10 min or more.

* * * * *